S. E. MALLETT.
Churn.

No. 81.519

Patented Aug. 25, 1868.

Witnesses:

Inventor:

United States Patent Office.

S. E. MALLETT, OF CORRY, PENNSYLVANIA.

Letters Patent No. 81,519, dated August 25, 1868.

IMPROVEMENT IN CREAM-SAVER.

The Schedule referred to in these Letters Patent and making part of the same.

TO ALL WHOM IT MAY CONCERN:

Be it known that I, S. E. MALLETT, of Corry, in the county of Erie, and in the State of Pennsylvania, have invented a new and useful Cream-Saver for dasher-churns when used in churning butter; and I do hereby declare that the following is a full, clear, and exact description thereof, reference being had to the accompanying drawings, and to the letters of reference marked thereon, making a part of this specification.

Figure 2:
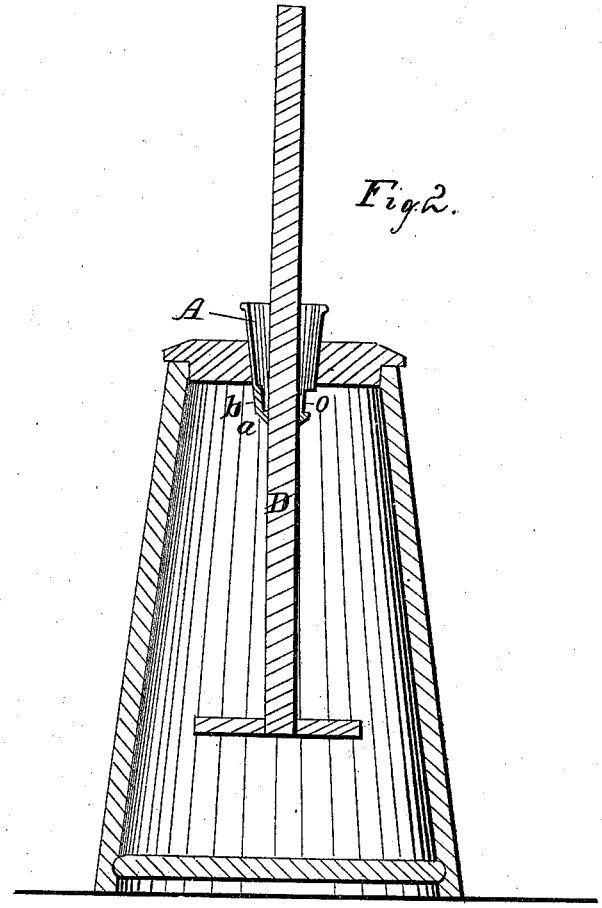
Figure 1:
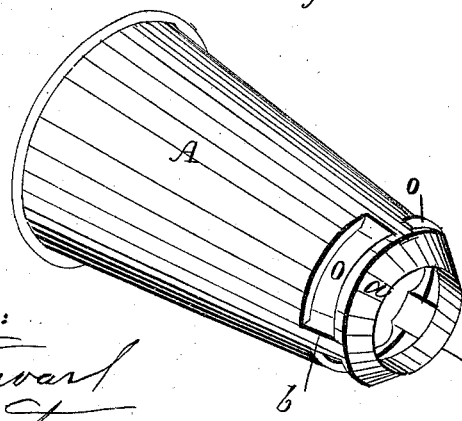

Figure 1 is a perspective view of my improved cream-saver for dasher-churns, and Figure 2 is a vertical section through the same, shown as I adjust it in practice.

The nature of my invention consists in making, of metal or other suitable material, a cream-saver, in form of a truncated hollow cone, which shall prevent the cream from splashing out of the top of a dasher-churn; also, save what cream may adhere to the dasher-rod, by scraping the cream off the said rod and cause it to run back into the churn; also, providing such cream-saver with an opening or openings for the free passage of air to and from the churn.

To enable those skilled in the art to make and use my invention, I will now describe its construction and operation.

A is the body of the saver, and is in general form that of a truncated hollow cone, and usually about three (3) inches in length. This form of the saver enables me to force it into the head B, and wedge it so tight that no other fastening is necessary to hold it in position.

The diameter of the end, $a$, is about the same as the diameter of the dasher-rod D, and around which it is intended to fit snugly, but yet not so tight as to prevent it from working easily and rapidly. The end, $a$, is preferably made as shown in the drawings, that is to say, a ring, $a$, having square edges on its lower and upper sides next to the dasher-rod D, for when thus formed the cream is scraped off better than if the edges were round. The end or ring $a$ is united to the body of the saver by connections $b$, for by so doing I am enabled to have larger openings $o$ through which the air can pass in and out of the churn than by having round or any other-shaped openings.

It will be seen from the above description that my invention is made complete in itself, and may be adjusted to any dasher-churn.

The cream-saver having been adjusted to the churn-head B, (as shown in fig. 2,) the dasher D is drawn up to its greatest working-height, and as its rod passes up through the ring $a$, the cream adhering to the rod is scraped off and flows back on the under side of the ring to the churn. At the same time that the dasher is on its downward movement, the air escapes through the openings $o$ and into the open air. On forcing the dasher back, a reverse motion or operation is the result.

Having thus fully explained my invention, what I claim as new, and desire to secure by Letters Patent, is—

The cream-saver A, constructed and operating substantially as and for the purposes herein described, with or without openings $o$.

In testimony that I claim the above-described cream-saver for dasher-churns, when used in making butter therein, I have hereunto signed my name, this 7th day of April, 1868.

S. E. MALLETT.

Witnesses:
T. G. CLAYTON,
Jo. C. CLAYTON.